Sept. 4, 1951  J. A. DONELAN  2,567,012
COMBINED PRESSURE WELDING AND ARC WELDING METHOD
Filed Aug. 7, 1948
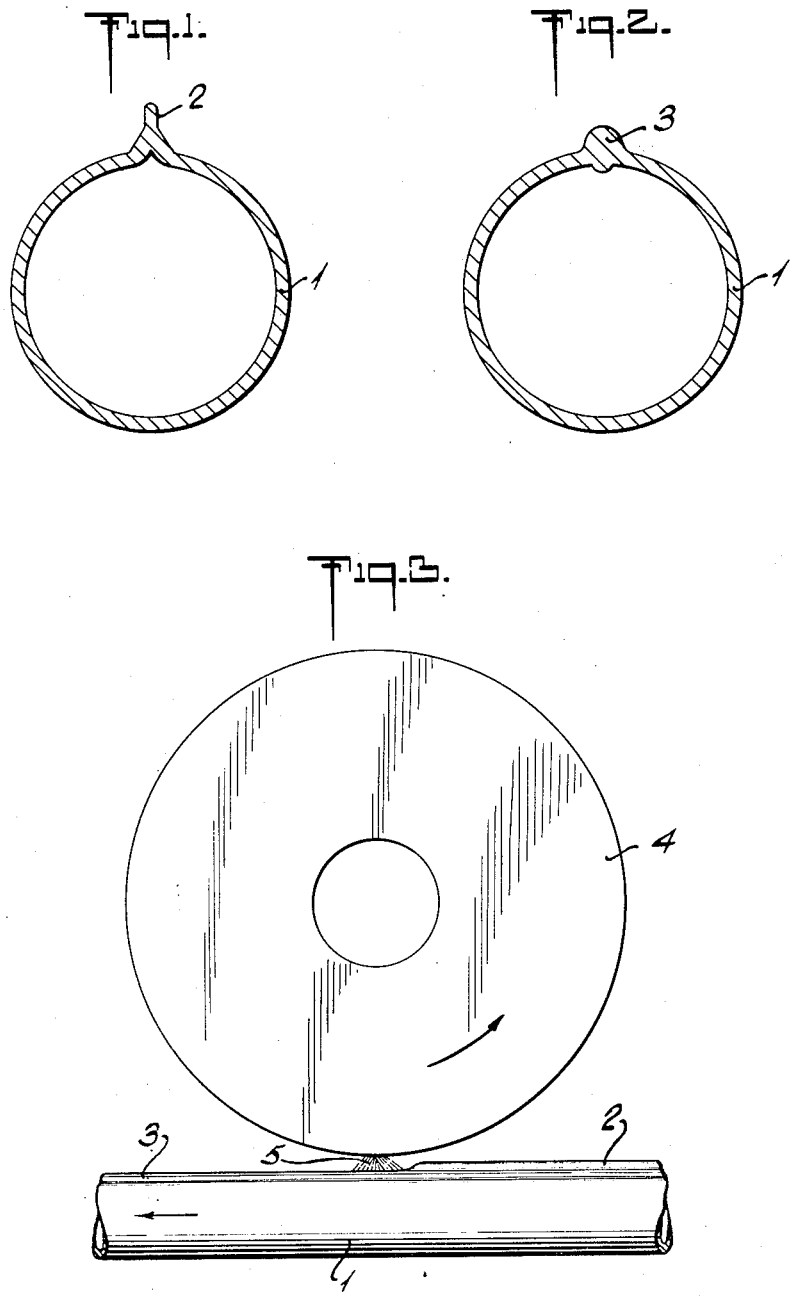
INVENTOR.
JAMES ARTHUR DONELAN.
BY
ATTORNEY.

Patented Sept. 4, 1951

2,567,012

UNITED STATES PATENT OFFICE 2,567,012

COMBINED PRESSURE WELDING AND ARC WELDING METHOD

James Arthur Donelan, West Harrow, England, assignor to The General Electric Company, Limited, London, England Application August 7, 1948, Serial No. 43,068
In Great Britain April 15, 1947

10 Claims. (Cl. 219—10)

1

This invention relates to the welding of ductile metals such as aluminium, aluminium alloys, copper and the like which are capable of being cold pressure welded; that is to say, such that a weld may be effected without extraneous supply of any substantial amount of heat simply by applying sufficient pressure to metal surfaces in contact to cause the metal of the surfaces to flow and weld.

The invention also relates more particularly, but not exclusively, to the manufacture of sheaths of metal of this nature for electric cables.

In the known methods of providing a cable with an aluminium sheath, it is usual to fold a strip of aluminium sheet around the conductor or conductors of the cable so that the edges of the strip lie flat against one another, and then make a seam weld of the edges using resistance welding, the welding current passing from one welding electrode to the other through two thicknesses of the strip and, of course, the junction of the two faces.

Now resistance welding of pure aluminium is exceedingly difficult owing to its low resistance and aluminium alloys including, for example, a proportion of manganese, have been developed having a higher specific resistance than pure aluminium in an attempt to facilitate the resistance welding of the seam. Such alloys are, however, not completely satisfactory and it would be advantageous if a more satisfactory method of seam welding the sheaths of cable could be devised.

One of the objects of the present invention is the provision of a method of welding the aluminium and aluminium alloy sheath of an electric cable which results in a satisfactory weld.

According to the present invention, a method of welding together two surfaces of metal such as aluminium, aluminium alloy, copper or the like capable of being cold pressure welded as defined above comprises the steps of first welding the surfaces together by cold pressure welding and subsequently fusing the cold pressure weld so formed, for example, by electric arc welding.

A D. C. or A. C. carbon arc may be used for the electric arc welding or atomic hydrogen welding may be used. An argon shielded arc may also be used.

A flux may be used during the electric arc welding and, if the method according to the invention is used for seaming the aluminium sheath of an electric cable, then since the cold weld effectively seals the seam, there is no possibility of the flux damaging the conductor or conductors of the cable.

In applying the invention to the manufacture of the aluminium sheath of a sheathed electric cable, a strip of aluminium would be folded around a group of insulated electric cables, the strip being of such width that the free edges of the

2 strip may be pressed flat against one another to provide a radial projection of thickness twice the thickness of the strip. The facing edges of the strip would be cleaned by mechanical scratch brushing and then the projection run through two opposing wheels having specially formed peripheries, the wheels being so positioned or forced together with sufficient pressure to produce a solid phase cold pressure weld and shear off the free edge of the projection.

In the accompanying drawings in which I have shown one of the various possible embodiments of my invention, Fig. 1 is a cross-section of a sheath constructed in accordance with my invention, the same being shown after cold pressure welding;

Fig. 2 is a cross-section of the sheath shown in Fig. 1 after the cold pressure weld has been fused; and Fig. 3 is a diagrammatic showing of a welding arrangement for fusing the cold pressure weld.

Referring now to the drawings and more particularly to Fig. 1, it will be seen that the sheath 1 has a radially projecting cold welded portion 2.

Then, the cold pressure weld is fused, with or without the use of a flux, by electric arc welding using, for example, a D. C. or A. C. carbon arc. A cross-section of the sheath 1 after the cold pressure weld has been fused is shown in Figure 2 and referring to this figure, it will be seen that the fusion weld 3 has run in so that there is no sharp change in the contour of the inner surface of the sheath 1. The advantage of cold pressure welding the edges of the seam together before fusion welding is that air is excluded from the seam and oxidation during fusion welding limited or prevented.

A rotating carbon disc electrode may be used for the electric arc or fusion welding and a somewhat diagrammatic showing of a welding arrangement is shown in Figure 3. Referring to this figure, the sheath 1 is placed with the cold pressure weld 2 uppermost under the tapered edge of a rotatable carbon disc 4 and the sheath moved in the direction of the arrow shown thereon at about 15–30 feet per minute and the disc 4 rotated in the direction of the arrow shown thereon at a circumferential space of about 1–1½ feet per minute. Rotation of the disc 4 tends to stabilise the length of the arc 5 and, if D. C. is used for the arc supply, the sheath should be positive. As an example, a sheath of 0.036" thickness commercially pure aluminium has been successfully welded by cold pressure welding first and then fusing the cold pressure weld with a D. C. carbon arc of 160 amps. at a welding speed of 25 feet per minute.

I claim:

1. The method of welding two aluminum pieces comprising the steps of scratch-brushing the areas of contact to be joined, placing the scratch-brushed surfaces in contact with each other, applying, substantially without supply of external heat, to the area to be joined, a pressure to cause the metal of said surfaces to cold flow into intimate contact and to seal said surfaces at said area by cold welding, and subjecting the metal surrounding the cold weld formed to heat of a temperature, to cause the metal to fuse and flow at said weld.

2. The method of welding two aluminum pieces comprising the steps of cleaning the areas of contact to be joined to produce metallic surfaces uncontaminated by matter foreign to the metal, placing the cleaned surfaces in contact with each other, applying, substantially without supply of external heat, to the area to be joined a pressure to cause the metal of said surfaces to cold flow into intimate contact and to seal said surfaces at said area by cold welding, and subjecting the metal surrounding the cold weld formed to heat of a temperature, to cause the metal to fuse and flow at said weld.

3. The method of welding two non-ferrous ductile metal pieces comprising the steps of cleaning the areas of contact to be joined to produce metallic surfaces uncontaminated by matter foreign to the metal, placing the cleaned surfaces in contact with each other, applying, substantially without supply of external heat, to the area to be joined a pressure to cause the metal of said surfaces to cold flow into intimate contact and to seal said surfaces at said area by cold welding, and subjecting the metal surrounding the cold weld formed to heat of a temperature, to cause the metal to fuse and flow at said weld.

4. The method of welding two aluminum pieces comprising the steps of cleaning the areas of contact to be joined to produce clean metallic surfaces uncontaminated by matter foreign to the metal, placing the cleaned surfaces in contact with each other, applying, substantially without supply of external heat, to the area to be joined a pressure to cause the metal of said surfaces to cold flow into intimate contact and to seal said surfaces at said area by cold welding, and subjecting the metal surrounding the cold weld formed to an electric arc, to cause the metal to fuse and flow at said weld.

5. The method of welding together the overlying edge portions of a pair of aluminum sheets comprising the steps of scratch-brushing the areas of contact to be joined, placing the scratch-brushed surfaces in contact with each other, applying, substantially without supply of any external heat, to a strip-like area of said edge portions a pressure, to cause the metal of said surfaces to cold flow into intimate contact and to seal said surfaces at said area by cold welding, and subjecting said edge portions to heat of a temperature, to cause the metal surrounding the cold weld formed to fuse and flow at said weld.

6. The method of welding the overlapping edge portions of a pair of sheets of non-ferrous ductile metal comprising the steps of cleaning the areas of contact to be joined to produce surfaces uncontaminated by matter foreign to the metal, placing the cleaned surfaces in contact with each other, applying, substantially without supply of external heat, to a strip-like area of said edge portions a pressure, to cause the metal of said surfaces to cold flow into intimate contact and to seal said surfaces at said area by cold welding, and subjecting said edge portions to heat of a temperature, to cause the metal surrounding the cold weld formed to fuse and flow at said weld.

7. The method of manufacturing an aluminum tube comprising forming a sheet of aluminum into tubular shape with two outer radial flanges along a longitudinal edge thereof, scratch-brushing the adjoining surfaces of said flanges, applying, substantially without the supply of external heat, a pressure to said flanges to cause the metal of the adjoining surfaces thereof to cold flow into intimate contact and to seal said flanges by cold welding, and subjecting said flanges to heat of a temperature, to cause the metal surrounding the weld formed to fuse and flow at said weld.

8. The method of manufacturing tubes of non-ferrous ductile metal comprising forming a metal sheet into tubular shape with two outer radial flanges along a longitudinal edge thereof, cleaning the adjoining surfaces of said flanges to produce pure metallic surfaces substantially uncontaminated by matter foreign to the metal, applying, substantially without the supply of external heat, a pressure to said flanges to cause the metal of the adjoining surfaces thereof to cold flow into intimate contact and to seal said flanges by cold welding, and subjecting said flanges to heat of a temperature, to cause the metal surrounding the weld formed to fuse and flow at said weld.

9. The method of fusion welding two pieces of aluminum comprising the steps of scratch-brushing the areas of contact to be joined, placing the scratch-brushed surfaces in contact with each other, applying, substantially without the supply of external heat, to said surfaces a pressure to cause the metal thereof to cold flow into intimate contact and to seal said surfaces against intrusion of foreign matter, and subjecting the metal surrounding the sealed area to heat of a temperature, to cause the metal to fuse and flow at said area.

10. The method of fusion welding two pieces of non-ferrous ductile metal comprising the steps of cleaning the areas of contact to be joined to produce pure metallic surfaces, placing the cleaned surfaces in contact with each other, applying, substantially without supply of external heat, to said surfaces a pressure to cause the metal thereof to cold flow into intimate contact and to seal said surfaces against intrusion of foreign matter, and subjecting the metal surrounding the sealed area to heat of a temperature, to cause the metal to fuse and flow at said area.

JAMES ARTHUR DONELAN.

REFERENCES CITED

The following references are of record in the file of this patent:

UNITED STATES PATENTS

| Number | Name | Date |
|---|---|---|
| 1,217,431 | Foley | Feb. 27, 1917 |
| 1,298,590 | Smith | Mar. 25, 1919 |
| 1,952,319 | Hull | Mar. 27, 1934 |
| 2,228,087 | Rose | Jan. 7, 1941 |
| 2,320,824 | Landis et al. | June 1, 1943 |
| 2,427,597 | Garner et al. | Sept. 16, 1947 |

FOREIGN PATENTS

| Number | Country | Date |
|---|---|---|
| 355,966 | Great Britain | Sept. 3, 1931 |
| 627,432 | Great Britain | Aug. 9, 1949 |